US009883407B2

(12) United States Patent
Sato et al.

(10) Patent No.: US 9,883,407 B2
(45) Date of Patent: Jan. 30, 2018

(54) RADIO WAVE PROPAGATION ENVIRONMENT MEASURING APPARATUS, RADIO NETWORK CONSTRUCTION SYSTEM, AND METHOD FOR MEASURING RADIO WAVE PROPAGATION ENVIRONMENT

(75) Inventors: Yoshihito Sato, Tokyo (JP); Tsutomu Yamada, Tokyo (JP); Hiromichi Endo, Tokyo (JP)

(73) Assignee: Hitachi, Ltd., Tokyo (JP)

(*) Notice: Subject to any disclaimer, the term of this patent is extended or adjusted under 35 U.S.C. 154(b) by 1080 days.

(21) Appl. No.: 14/126,173

(22) PCT Filed: Jun. 16, 2011

(86) PCT No.: PCT/JP2011/063783
§ 371 (c)(1),
(2), (4) Date: Dec. 13, 2013

(87) PCT Pub. No.: WO2012/172670
PCT Pub. Date: Dec. 20, 2012

(65) Prior Publication Data
US 2014/0114635 A1    Apr. 24, 2014

(51) Int. Cl.
*G06F 17/50* (2006.01)
*G06G 7/62* (2006.01)
(Continued)

(52) U.S. Cl.
CPC ........... *H04W 16/18* (2013.01); *H04B 17/20* (2015.01); *H04B 17/318* (2015.01);
(Continued)

(58) Field of Classification Search
CPC ..... H04B 17/20; H04B 17/318; H04W 16/18; H04W 16/20
(Continued)

(56) References Cited

U.S. PATENT DOCUMENTS 6,995,705 B2 *  2/2006  Bradford ............... G01S 7/4004
                                                    342/175
7,096,173 B1 *  8/2006  Rappaport ............ H04W 16/18
                                                    455/422.1
(Continued)

FOREIGN PATENT DOCUMENTS

JP    2005-70840 A    3/2005
JP    2005-102276 A   4/2005
(Continued)

OTHER PUBLICATIONS

Hyberg teaches an (Antenna Array Mapping for DOA Estimation in Radio Signal Reconnaissance, 2005 (266 pages)).*
(Continued)

*Primary Examiner* — Andre Pierre Louis
(74) *Attorney, Agent, or Firm* — Crowell & Moring LLP

(57) ABSTRACT

A method for measuring a radio wave propagation environment includes installing radio signal transmission and reception apparatuses where a radio network system is to be constructed and obtaining an electromagnetic wave measured value of a signal between transmission and reception apparatuses; estimating an electromagnetic wave propagation state of the signal using an electrical property and information on a three-dimensional structure at the site to obtain an electromagnetic wave estimated value; making a comparison between measured and estimated values for each time of day to determine when errors between measured and estimated values exceed a reference value; obtaining an electromagnetic path between transmission and reception apparatuses; and modifying structure information in the wave path to re-obtain the estimated value; and comparing the measured re-obtained estimated value to modify the three-dimensional structure information so that the error value becomes smaller.

18 Claims, 13 Drawing Sheets

(51) Int. Cl.
*H04W 16/18* (2009.01)
*H04B 17/318* (2015.01)
*H04B 17/391* (2015.01)
*H04B 17/20* (2015.01)
*H04W 16/20* (2009.01)
*H04B 17/23* (2015.01)
*H04B 17/27* (2015.01)

(52) U.S. Cl.
CPC ........... *H04B 17/391* (2015.01); *H04B 17/23* (2015.01); *H04B 17/27* (2015.01); *H04W 16/20* (2013.01)

(58) Field of Classification Search
USPC ............................... 703/13; 455/90.2, 422.1
See application file for complete search history.

(56) References Cited

U.S. PATENT DOCUMENTS

2002/0002046 A1    1/2002   Okanoue et al.
2010/0022204 A1*   1/2010   Rofougaran ........ H01P 1/20372
                                                            455/90.2

FOREIGN PATENT DOCUMENTS

JP    2005-229453 A    8/2005
JP    2009-290333 A    12/2009

OTHER PUBLICATIONS

Corresponding International Search Report with English Translation dated Jul. 12, 2011 (five (5) pages).

Extended European Search Report dated Oct. 21, 2014 (Seven (7) pages).

* cited by examiner

*FIG. 14*

| STRUCURE | | COORDINATE(m) | | | | SHAPE |
|---|---|---|---|---|---|---|
| TYPE | NAME | | X | Y | Z | |
| WALL | W1 | START POINT | 0 | 0 | 0 | CUBIC STRUC- TURE |
| | | END POINT | 16 | 0.5 | 3 | |
| WALL | W2 | START POINT | 15.5 | 0 | 0 | CUBIC STRUC- TURE |
| | | END POINT | 16 | 9.5 | 3 | |
| ⋮ | ⋮ | | | | | |
| PILLAR | P1 | START POINT | 0 | 0 | 0 | CUBIC STRUC- TURE |
| | | END POINT | 1 | 1 | 3 | |
| PILLAR | P2 | START POINT | 3 | 0 | 0 | CUBIC STRUC- TURE |
| | | END POINT | 4 | 1 | 3 | |
| ⋮ | ⋮ | | | | | |
| EQUIP- MENT | M1 | | | | | |
| | | | | | | |

RADIO WAVE PROPAGATION ENVIRONMENT MEASURING APPARATUS, RADIO NETWORK CONSTRUCTION SYSTEM, AND METHOD FOR MEASURING RADIO WAVE PROPAGATION ENVIRONMENT

TECHNICAL FIELD

The present invention relates to a radio wave propagation environment measuring apparatus, a radio network construction system, and a method for measuring a radio wave propagation environment that help design the radio wave propagation environment of a radio network system.

BACKGROUND ART

The multi-hop wireless network communication technology is a technology by which a radio station exchanges data with the desired radio station in a multi-hop manner via multiple radio stations installed as relay stations between the radio stations.

Particularly in recent years, the cost of wireless communication devices for wireless LAN (local area network) or the like has been reduced, and sensor network technologies, including Bluetooth, which is a short-range wireless communication standard mainly for digital devices, and ZigBee, which is a short-range wireless communication standard mainly for household electrical appliances, have been standardized. Accordingly, expectation for application of wireless technologies to the industry field has been increased, and the number of application cases has been increased.

Multi-hop wireless networks are expected to contribute to reductions in the number of monitoring/control cables when they are applied to the industry field, including social infrastructure business, such as electric power or transportation, and monitoring/control networks for the manufacturing industry, such as factory automation (FA) and process automation (PA). Further, making wired cables wireless can result in reductions in the cost of cable installation or maintenance cost for a routine check. Furthermore, use of wireless technologies allows business entities to more flexibly deal with changes in operation, such as addition of equipment or a change in the configuration of equipment.

However, application of wireless real-time communication to the industry field requires high reliability, and a failure that occurs in a wireless network must be dealt with rapidly. For example, assume that a wireless network that meets a requirement by obtaining multiple paths using multi-hop communication is constructed. In this case, when one path fails, the reliability of one path will decrease. For this reason, in the construction of a path, it is necessary to design a favorable path that is insusceptible to the other paths to the extent possible. Further, even if the propagation state is favorable when a radio station is installed, the state may significantly change as the time passes.

For these reasons, it is desirable to measure the radio wave propagation state in positions in which radio stations can be installed at the site at which a wireless network is planned to be constructed and to design the layout of the radio stations on the basis of the measurement results. However, it is difficult to make actual measurements in all parts of a wide industrial field. For this reason, instead of making measurements comprehensively as described above, it is necessary to estimate the propagation environment of the site by constructing virtual models on a computer and then performing radio wave propagation simulations. Further, when the propagation state changes as the time passes, it is necessary to identify the cause of the change.

However, performing a radio wave propagation simulation requires three-dimensional shapes of structures included in the site at which a radio network is planned to be constructed and material property information of the structures, such as permittivity, permeability, or conductivity. Further, even when the environment changes, it is necessary to be able to easily identify the causes of changes in the three-dimensional shapes and the material property information corresponding to the change in the environment.

There are also techniques which use a statistical model based on experimental values in various places to estimate radio wave propagation. However, to construct a radio network system which is required to be reliable as described above, it is desirable to design a network which considers a propagation environment specific to the site.

With regard to these points, Patent Literature 1 generates polygon data for radio wave propagation simulation using a laser scanner, image sensor, or the like. Patent Literature 1 further discloses a method of obtaining three-dimensional point coordinate group data using a laser scanner disposed in a mobile object and generating polygon model data in space along the traveling direction of the mobile object.

CITATION LIST

Patent Document

[Patent Document 1] Japanese Unexamined Patent Application Publication No. 2005-70840

SUMMARY OF INVENTION

Technical Problem

While Patent Document 1 can obtain three-dimensional shapes, it cannot obtain material properties. To perform a radio wave propagation simulation, it is necessary to additionally set material properties on the obtained polygon data. Since what is obtained as a polygon model is only the shape of the surface, transmission characteristics with which electromagnetic waves propagate through the shape are also unknown. In a plant, factory, building, or the like, a propagation path which transmits through a wall, floor, window, or the like also serves as an important transmission path. For this reason, transmission characteristics of the wall or the like are also preferably obtained.

In view of the foregoing, an object of the present invention is to provide, in order to construct a reliable radio network, a radio wave propagation environment measuring apparatus, a radio network construction system, and a method for measuring a radio wave propagation environment that can easily obtain three-dimensional shape data and material property data required to estimate the radio wave propagation between radio stations when constructing a radio network system.

Solution to Problem

To accomplish the above object, a radio wave propagation environment measuring apparatus according to the present invention includes an electromagnetic wave transmission means disposed at a site at which a radio network system is planned to be constructed, the electromagnetic wave transmission means being configured to transmit a radio signal, and an electromagnetic wave measuring means configured to receive the radio signal to obtain an electromagnetic wave measured value; a three-dimensional structure input means configured to input an electrical property and three-dimensional structure information of a structure included in the site, the three-dimensional structure information including three-dimensional shape information; a propagation state estimation unit configured to estimate an electromagnetic wave propagation state between the electromagnetic wave transmission means and the electromagnetic wave measuring means using the three-dimensional structure information to obtain an electromagnetic wave estimated value; an estimation error mapping unit configured to make a comparison between the electromagnetic wave measured and estimated values for each time of day, the electromagnetic wave measured and estimated values being expressed as signal strength, to obtain a time domain where an error value between the electromagnetic wave measured and estimated values is greater than a reference value and to obtain, in the time domain, a path through which a radio signal from the electromagnetic wave transmission means is received by the electromagnetic wave measuring means, the path being referred to as an electromagnetic wave path; and a question generation unit configured to re-obtain the electromagnetic wave estimated value by modifying the three-dimensional structure information of an area located on the electromagnetic wave path and to make a comparison between the electromagnetic wave measured value and the re-obtained electromagnetic wave estimated value to modify the three-dimensional structure information so that the error value becomes smaller.

The radio wave propagation environment measuring apparatus includes a display apparatus configured to display information related to the three-dimensional structure information of an area located on the electromagnetic wave path on a layout drawing of a structure included in the site at which a wireless network system is planned to be constructed.

The information related to the three-dimensional structure information displayed on the display apparatus is information indicating that a value of an electrical property of the structure in the area is not appropriate.

The information related to the three-dimensional structure information displayed on the display apparatus is information pointing out modification of a value of an electrical property of the structure in the area.

The radio wave propagation environment measuring apparatus includes a three-dimensional structure information modification means configured to modify a value of the three-dimensional structure information.

The three-dimensional structure information modification means selects and inputs one of determined and undetermined as an attribute value of a material property.

The radio wave propagation environment measuring apparatus includes a material property estimation unit configured to divide target space of the site at which a radio network system is planned to be constructed into blocks and to estimate a material property of a three-dimensional shape for each of the blocks.

To accomplish the above object, a radio wave propagation environment measuring apparatus according to the present invention includes an electromagnetic wave transmission means disposed at a site at which a radio network system is planned to be constructed, the electromagnetic wave transmission means being configured to transmit a radio signal, and an electromagnetic wave measuring means configured to receive the radio signal to obtain an electromagnetic wave measured value; a three-dimensional structure input means configured to input an electrical property and three-dimensional structure information of a structure included in the site, the three-dimensional structure information including three-dimensional shape information; a propagation state estimation unit configured to estimate an electromagnetic wave propagation state between the electromagnetic wave transmission means and the electromagnetic wave measuring means using the three-dimensional structure information to obtain an electromagnetic wave estimated value; an estimation error mapping unit configured to make a comparison between the electromagnetic wave measured and estimated values for each time of day, the electromagnetic wave measured and estimated values being expressed as signal strength, to obtain a time domain where an error value between the electromagnetic wave measured and estimated values is greater than a reference value and to obtain, in the time domain, a path through which a radio signal from the electromagnetic wave transmission means is received by the electromagnetic wave measuring means, the path being referred to as an electromagnetic wave path; and a question generation unit configured to re-obtain the electromagnetic wave estimated value by modifying the three-dimensional structure information of an area located on the electromagnetic wave path and to make a comparison between the electromagnetic wave measured value and the re-obtained electromagnetic wave estimated value to modify the three-dimensional structure information so that the error value becomes smaller; a display apparatus configured to display information related to the three-dimensional structure information of the area located on the electromagnetic wave path on a layout drawing of the structure included in the site at which a radio network system is planned to be constructed; and a three-dimensional structure information modification means configured to modify a value of the three-dimensional structure information.

To accomplish the above object, a wireless network construction system according to the present invention includes radio communication apparatuses disposed in positions at a site at which a radio network system is planned to be constructed, the radio communication apparatuses being configured to transmit or receive a radio signal; a radio control apparatus configured to communicate with the radio communication apparatuses; an electromagnetic wave measuring means configured to receive, from the radio control apparatus, radio signals transmitted by the radio communication apparatuses to obtain electromagnetic wave measured values and a position and direction of an antenna of each radio communication apparatus; a three-dimensional structure input means configured to receive an electrical property and three-dimensional structure information of a structure included in the site, the three-dimensional structure information including three-dimensional shape information; a propagation state estimation unit configured to estimate an electromagnetic wave propagation state between the electromagnetic wave transmission means and the electromagnetic wave measuring means using the three-dimensional structure information to obtain an electromagnetic wave estimated value; an estimation error mapping unit configured to make a comparison between the electromagnetic wave measured and estimated values for each time of day, the electromagnetic wave measured and estimated values being expressed as signal strength, to obtain a time domain where an error value between the electromagnetic wave measured and estimated values is greater than a reference value and to obtain, in the time domain, a path through which a radio signal from the electromagnetic wave transmission means is received by the electromagnetic wave measuring means, the path being referred to as an electromagnetic wave path; a question generation unit configured to re-obtain the electromagnetic wave estimated value by modifying the three-dimensional structure information of an area located on the electromagnetic wave path and to make a comparison between the electromagnetic wave measured value and the re-obtained electromagnetic wave estimated value to modify the three-dimensional structure information so that the error value becomes smaller; and an antenna position instruction means configured to cause the propagation state estimation unit to change the antenna position and estimate propagation on the basis of the modified three-dimensional structure information and to present an antenna position in which there exists a propagation state similar to a desired propagation state of a plurality of propagation states.

To accomplish the above object, a method for measuring a radio wave propagation environment according to the present invention includes installing radio signal transmission and reception apparatuses at a site at which a radio network system is planned to be constructed and obtaining an electromagnetic wave measured value of a radio signal between the radio signal transmission and reception apparatuses; estimating an electromagnetic wave propagation state of a radio signal between the radio signal transmission and reception apparatuses using an electrical property and three-dimensional structure information of a structure included in the site, the three-dimensional structure information including three-dimensional shape information, to obtain an electromagnetic wave estimated value; making a comparison between the electromagnetic wave measured and estimated values for each time of day, the electromagnetic wave measured and estimated values being expressed as signal strength, to obtain a time domain where an error value between the electromagnetic wave measured and estimated values is greater than a reference value; obtaining, as an electromagnetic wave path, a path between the radio signal transmission and reception apparatuses, of a radio signal received in the time domain; and modifying the three-dimensional structure information of an area located on the electromagnetic wave path to re-obtain the electromagnetic wave estimated value; and making a comparison between the electromagnetic wave measured value and the re-obtained electromagnetic wave estimated value to modify the three-dimensional structure information so that the error value becomes smaller.

Advantageous Effects of Invention

According to the present invention, it is possible to easily obtain three-dimensional shape data and material property data required to estimate the radio wave propagation between radio stations when constructing a radio network system.

BRIEF DESCRIPTION OF DRAWINGS

FIG. 14 is a diagram showing an example of a three-dimensional structure information 401 represented by coordinates.

DESCRIPTION OF EMBODIMENTS

Figure 1:
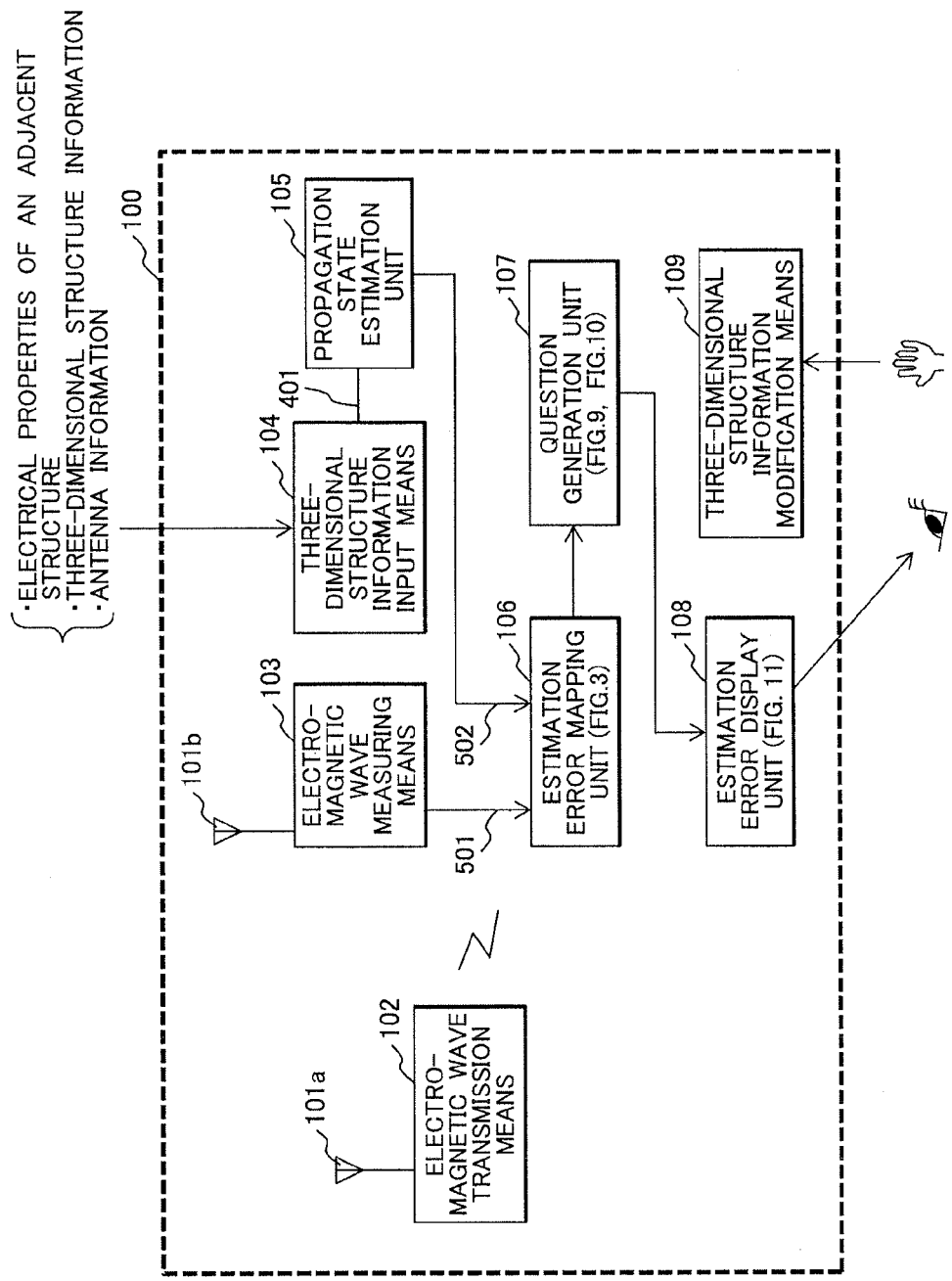
FIG. 1 is a diagram showing an example configuration of a radio wave propagation environment measuring apparatus according to a first embodiment.

Now, embodiments of the present invention will be described in detail with reference to the drawings.
First Embodiment
FIG. 1 is a diagram showing an example configuration of a radio wave propagation environment measuring apparatus 100 according to a first embodiment of the present invention. The radio wave propagation environment measuring apparatus 100 includes an electromagnetic wave transmission means 102 including a transmission antenna 101a, an electromagnetic wave measuring means 103 including a receiving antenna 101b, a three-dimensional structure information input means 104, a propagation state estimation unit 105, an estimation error mapping unit 106, a question generation unit 107, an estimation error display unit 108, and a three-dimensional structure information modification means 109.

Before describing the configuration of FIG. 1 in detail, the functions of the radio wave propagation environment measuring apparatus 100 will be outlined. One input, 501, provided to the estimation error mapping unit 106 is actually measured data (measured value) from the electromagnetic wave measuring means 103; the other input, 502, provided thereto is estimated data (estimated value) from the propagation state estimation unit 105. In the present invention, more accurate radio wave propagation environment data is obtained based on the error between the measured value 501 and the estimated value 502.

The respective means in FIG. 1 will be sequentially described in detail, starting with the configurations of the means that obtain the measured value 501.

The electromagnetic wave transmission means 102 includes the transmission antenna 101a and electromagnetic wave transmission source (not shown) of a radio-frequency signal to be measured. The electromagnetic wave measuring means 103 includes the receiving antenna 101b configured to receive a signal transmitted from the electromagnetic wave transmission means 102 and a reception processing unit (not shown) configured to process the received signal and to output delay profile information.

Figure 4:
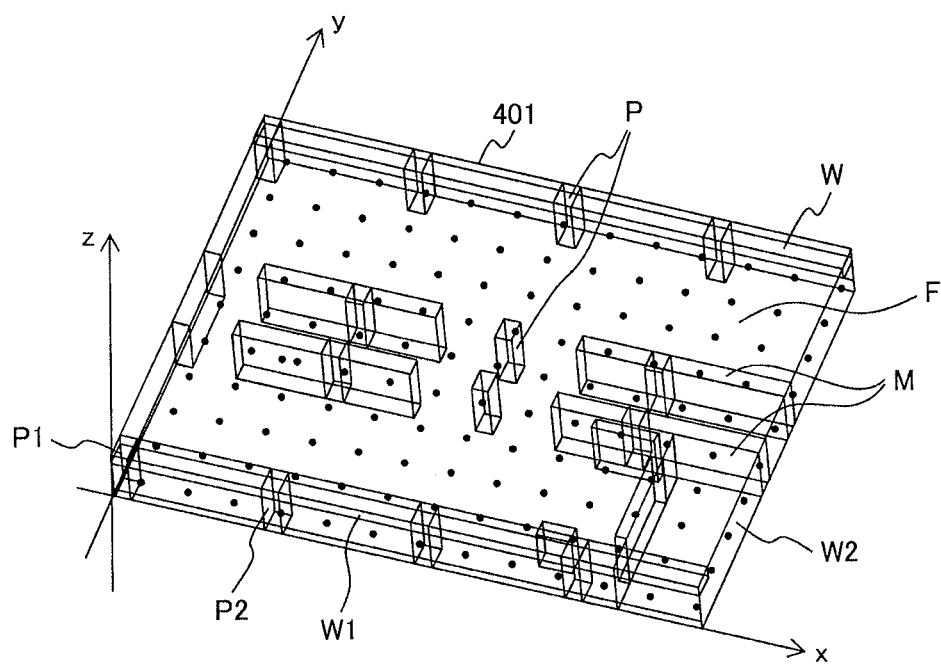
FIG. 4 is a diagram showing an example of a three-dimensional structure.

The electromagnetic wave transmission means 102 and the electromagnetic wave measuring means 103 are disposed, for example, in planned radio transmission/reception locations at a site of FIG. 4, at which a radio network is planned to be constructed, and used to measure the radio wave propagation environment between these locations.

The electromagnetic wave transmission means 102 and the electromagnetic wave measuring means 103 can obtain a delay profile by using radio transmission/reception apparatuses which use Ultra Wide Band (UWB), Orthogonal Frequency Division Multiplexing (OFDM), or Code Division Multiple Access (CDMA). Alternatively, measuring apparatuses, such as network analyzers, may be used as the electromagnetic wave transmission means 102 and the electromagnetic wave measuring means 103. Details of the delay profile will be described with reference to FIG. 5. The delay profile is one input, the measured value 501, provided to the estimation error mapping unit 106.

Next, the configurations of the means which obtain the estimated value 502 of FIG. 1 will be described in detail. First, the three-dimensional structure information input means 104 receives input of electrical properties (permittivity, permeability, conductivity, or the like) of an adjacent structure, three-dimensional structure information including three-dimensional shape information, and the positions, directions, and directivity characteristics of the antennas 101a and 101b and stores them in a storage unit (a storage medium, such as a memory or hard disk) which is not shown.

Among these, the three-dimensional structure information can include multiple entries and represent structures, including a wall surface, a floor, a ceiling, a window, and a partition, equipment, furniture, or the like. In each entry, data, such as one or more triangles or the coordinate values of a plane, represents a three-dimensional shape of an object.

The three-dimensional structure information input means 104 may be an input means which receives what the operator inputs manually through a keyboard or the like or may be an input means which is coupled to another apparatus to automatically obtain these pieces of information. For example, the three-dimensional structure information input means 104 may be coupled to a computer aided design (CAD) apparatus to use a CAD drawing as three-dimensional information. Alternatively, the three-dimensional structure information input means 104 may be coupled to a laser range scanner, three-dimensional recognition camera, or the like and used as an apparatus for inputting space information.

FIG. 4 shows an example of typical three-dimensional structures. Three-dimensional structures are, for example, structures on a particular floor of a building or the like, and a radio network is planned to be constructed on the particular floor. This building includes wall surfaces W, floors F, ceilings, windows, pillars P, and the like. Structures, such as equipment M or furniture, are also disposed in rooms partitioned by the walls or the like on this particular floor.

The positions of the three-dimensional structures on the particular floor, on which a radio network is planned to be constructed, are described using a predetermined three-dimensional coordinate system (x, y, z). For example, using the lower-left corner as the base point of the three-dimensional coordinate system (x, y, z), the positions of the structures, such as the wall surfaces W, the floor F, the ceiling, the window, the pillar P, the equipment M and furniture installed in the room, are predefined.

FIG. 14 is an example of three-dimensional structure information 401 represented by coordinates. The three-dimensional structure information 401 is stored as information indicating the types, names, three-dimensional coordinate systems (x, y, z), and shapes of the structures. In FIG. 14, three-dimensional structure information about the structures having cubic shapes, such as the walls and pillars, is represented in such a manner that the coordinate positions of two points on a diagonal line of each structure are specified. For example, a wall W1 in the lower part of FIG. 4 is a cubic structure having a start point at coordinates (0, 0, 0) and an end point at coordinates (16, 0.5, 3) and having a length of 16 m, a thickness of 0.5 m, and a height of 3 m. A pillar P1 around the base point is a cubic structure having a start point at coordinates (0, 0, 0) and an end point at coordinates (1, 1, 3) and having a length of 1 m, a thickness of 1 m, and a height of 3 m. A pillar P2 adjacent to the pillar P1 is a cubic structure having a start point at coordinates (3, 0, 0) and an end point at coordinates (4, 1, 3) and having a length of 1 m, a thickness of 1 m, and a height of 3 m.

While FIG. 14 shows an example of three-dimensional structure information, electrical properties (permittivity, permeability, conductivity, or the like) are stored for each adjacent structure. For example, electrical properties (permittivity, permeability, conductivity, or the like) of the material of the adjacent structure, the wall W1, are stored. The same goes for the other adjacent structures, for example, a pillar.

The propagation state estimation unit 105 of FIG. 1 estimates the radio wave propagation state between the transmission antenna 101a and the receiving antenna 101b using the three-dimensional structure information 401 inputted by the three-dimensional structure information input means 104. Techniques available for estimation include electromagnetic field analysis techniques, including the ray tracing method, the finite difference time domain method (FDTD), and the moment method.

Figure 6:
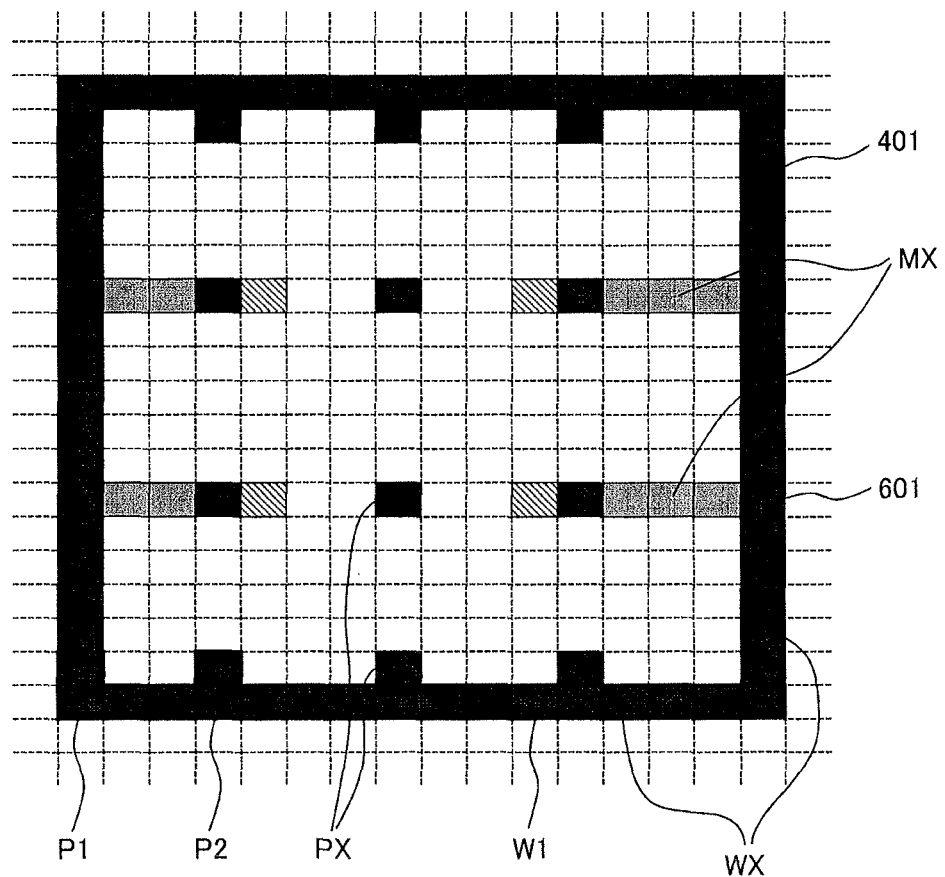
FIG. 6 is a diagram showing an example in which three-dimensional structure information representing three-dimensional structures on a particular floor is divided into pieces.

The propagation state estimation unit 105 divides the three-dimensional structure information 401 into pieces 601 of a predetermined size. FIG. 6 shows an example in which the three-dimensional structure information of FIG. 14 indicating the three-dimensional structures on the particular floor of FIG. 4 is divided into the pieces 601. The example shown herein is an example in which the three-dimensional shape of each object in the three-dimensional structure information is divided into piece sizes. While the pieces are defined as cubes having a height direction, the pieces are described below using an x-y two-dimensional area for the sake of simplicity unless three-dimensional description is required. This is because the heights of the structures (on the particular floor) discussed herein are uniformly 3 m.

A piece has, for example, a size in units of 1 m in an x direction and in units of 0.5 m in a y direction. Accordingly, the wall 1 having a length of 16 m and a thickness of 0.5 m in the lower part of FIG. 4 can be represented by 16 pieces extending from the position of the base point in the x direction. The pillar P1 around the base point can be represented by two pieces extending from the position of the base point in the y direction. All the other structures are represented by pieces as well. Information about pieces is stored with position information of the corresponding structure. Techniques available for division include space division techniques, including the voxel division technique, octree division, and kD-tree division.

In storing pieces 601, information about the individual pieces is stored as associated with electrical properties (permittivity, permeability, conductivity, or the like) of the corresponding adjacent structure inputted by the three-dimensional structure information input means 104. For example, if the structure is a wall, electrical properties (permittivity, permeability, conductivity, or the like) of the wall material are also stored with information about the pieces corresponding to the structure.

Figure 7:
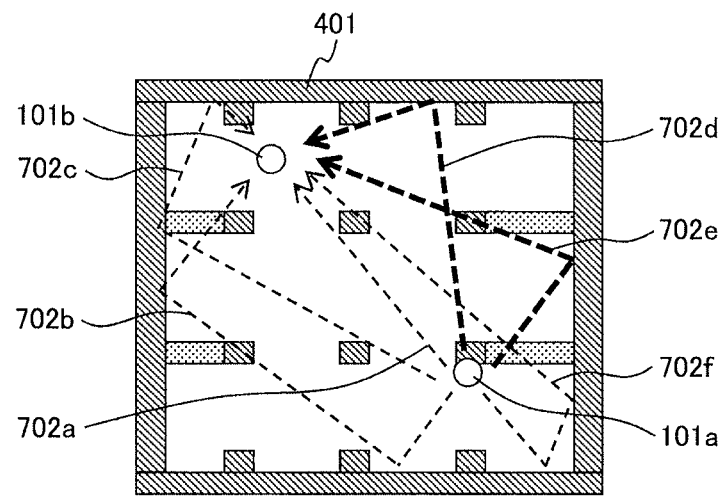
FIG. 7 is a diagram showing an example of a propagation state estimation made by a propagation state estimation unit 105.

FIG. 7 shows an example estimate of the propagation state made by the propagation state estimation unit 105 (FIG. 1). First, three-dimensional structure information 401 represented by pieces 601 is inputted to the propagation state estimation unit 105 together with electrical properties (permittivity, permeability, conductivity, or the like) of adjacent structures. Subsequently, the propagation state estimation unit 105 estimates the propagation between the transmission antenna 101a and the receiving antenna 101b disposed in the positions shown in FIG. 7. It is assumed that electromagnetic waves transmitted from the transmission antenna 101a in all directions (there is no directivity with respect to the transmission direction) are reflected or diffracted by structures, such as walls, or transmit therethrough, that is, travel electromagnetic wave paths 702a to 702f (shown by broken lines) and then reach the receiving antenna 101b. To simplify the description, a limited number of electromagnetic wave paths are shown.

Some electromagnetic wave paths are transmitted from one antenna and directly arrive the other antenna; some electromagnetic wave paths are transmitted from one antenna, reflected or diffracted by adjacent structures or transmit therethrough and thus attenuated, and then arrive the other antenna. Reflection loss, diffraction loss, or transmission loss which occurs when an electromagnetic wave is reflected or diffracted or transmits through is calculated by using electrical properties (permittivity, permeability, conductivity, or the like) of a piece in the position in which the electromagnetic wave is reflected or diffracted or transmits through.

Methods available to calculate such loss include calculation methods, including Fresnel's reflection coefficient or transmission coefficient, knife-edge diffraction coefficient, the geometrical theory of diffraction (GTD), and the uniform theory of diffraction (UTD). Literatures describing the relationship between electromagnetic waves and electrical properties (permittivity, permeability, conductivity, or the like) include Yoshio HOSOYA et al., "Radio Wave Propagation Handbook," Realize Co. Ltd., 1999.

From the layout of structures and the positions of these antennas in FIG. 7, it is understood that the receiving antenna 101b receives electromagnetic waves from a direction appropriately facing the transmission antenna 101a. Note that some received waves are directly received waves, and some received waves are waves received through reflection paths and that the arrival time of an electromagnetic wave varies according to the length of the electromagnetic path. The length of the electromagnetic wave path can be converted into the travelling time from the transmission antenna to the receiving antenna by using the speed of the electromagnetic wave. Further, the strength or amount of attenuation of the electromagnetic wave at each arrival time can be estimated.

The estimated values 502 of the radio wave propagation state between the transmission antenna 101a and the receiving antenna 101b estimated by the propagation state estimation unit 105 are expressed as time-series received signal strength signals.

In this way, the estimation error mapping unit 106 obtains a delay profile (measured values 501) from the electromagnetic wave measuring means 103 and obtains the radio wave propagation state estimated values 502 from the propagation state estimation unit 105. Both values are time-series reception strength signals indicating the radio wave propagation state between the transmission antenna 101a and the receiving antenna 101b.

Figure 5:
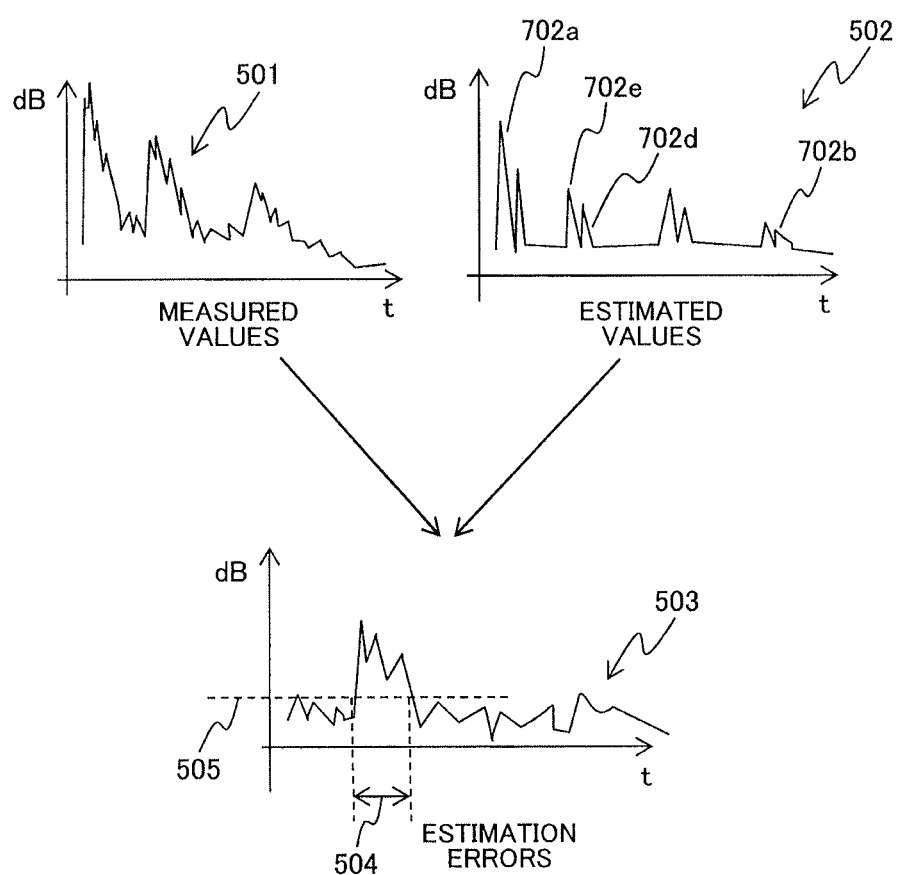
FIG. 5 includes diagrams showing an example of measured values and estimated values of a delay profile, and estimation errors.

FIG. 5 shows the measured values 501, which are an example of measured values of a delay profile measured by the electromagnetic wave measuring means 103, and the estimated values 502, which is an example of estimated values of a delay profile estimated by the propagation state estimation unit 105 of FIG. 1. The delay profile represents the strengths or amounts of attenuation of electromagnetic waves sampled at measured time intervals of $\Delta t$ with respect to the arrival times t of the electromagnetic waves.

In this example, the measured values 501 are measured values that have formed three large peaks as the time passes. On the other hand, the estimated values 502 obtained by the propagation state estimation unit 105 indicates that, of signals passing through the electromagnetic wave paths 702a to 702f (shown by broken lines), a signal passing through the electromagnetic wave path 702a has been directly received with a larger strength (a smaller amount of attenuation) earliest; signals passing through electromagnetic wave paths 702e and 702d with reflection have been received with smaller strengths later than the signal passing through the electromagnetic wave path 702a. A signal passing through the electromagnetic wave path 702b with two reflections has been received with an even smaller strength later than the above signals.

Figure 3:
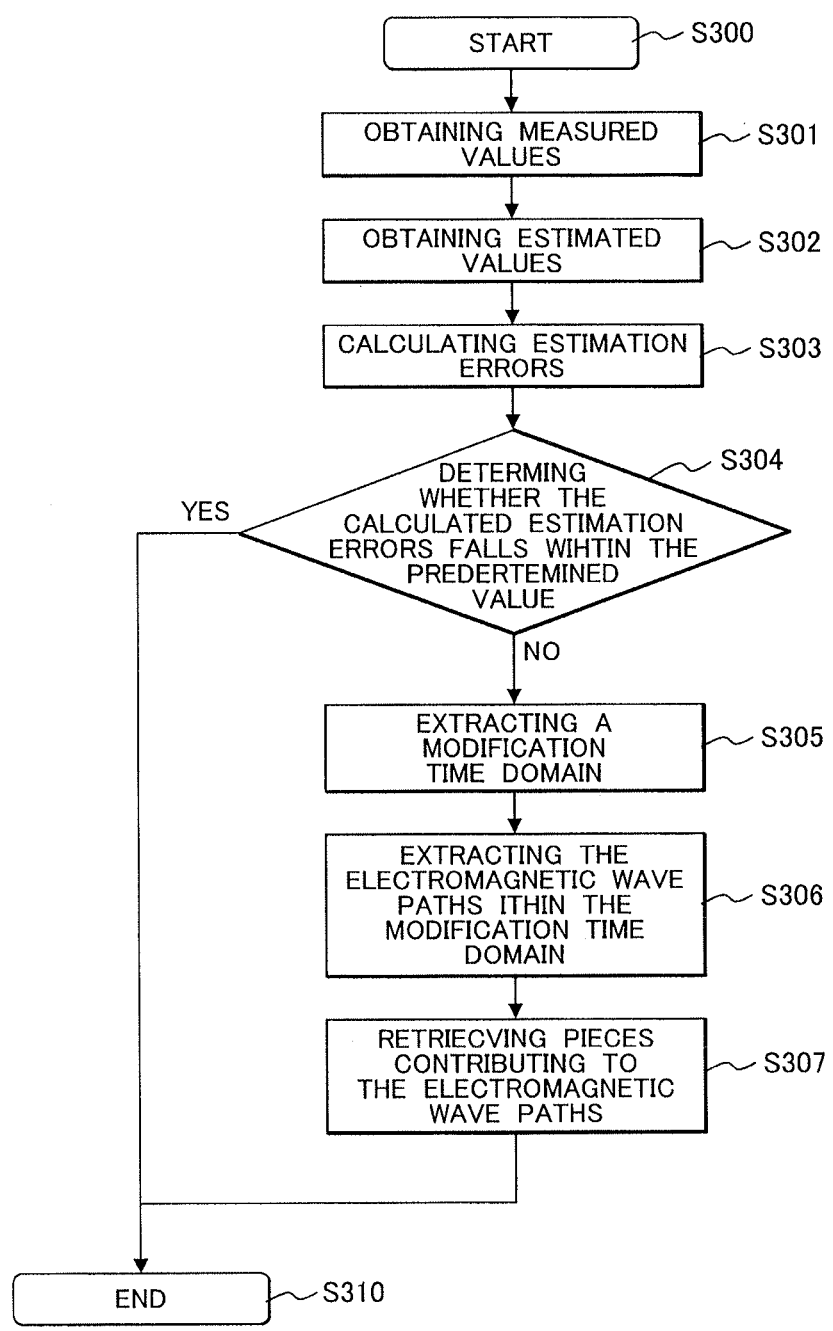
FIG. 3 is a diagram showing an example of the flow of a process performed by an estimation error mapping unit 106.

FIG. 3 shows the flow of a process performed by the estimation error mapping unit 105 of FIG. 1. As shown in FIG. 1, the estimation error mapping unit 105 is coupled to the electromagnetic wave measuring means 103 and the propagation state estimation unit 105 to receive measured values and estimated values of a delay profile.

The first step S300 of this process flow represents the start of the process.

In step S301, the estimation error mapping unit 106 obtains measured values 501 measured by the electromagnetic wave measuring means 103. In this obtaining step, the estimation error mapping unit 106 may be directly coupled to the electromagnetic wave measuring means 103 to obtain a measured value 501 each time a measurement is made or to obtain only data after measurements are complete. Note that in this measured value obtaining step, data is obtained by directly transmitting or receiving signals between locations in which a transmitter and a receiver are planned to be disposed on the particular floor of FIG. 4 on which a wireless network is planned to be constructed.

Step S302 is a step of obtaining estimated values 502 calculated by the propagation state estimation unit 105.

Step S303 is a step of calculating estimation errors. The estimation error mapping unit 105 of FIG. 1 calculates estimation error values 503 from the differences between the measured values 501 at the respective times in FIG. 5 and the estimated values 502 at the respective times in FIG. 5 obtained by the propagation state estimation unit 105. The estimation error values 503 may be the absolute values of the differences, the square roots of the mean squares of the differences, or the like. FIG. 5 shows an example of the estimation error values 503 obtained in a time-series manner.

In step S304, the estimation error mapping unit 106 determines at each time whether the calculated estimation error value 503 falls within an estimation error threshold 505, which is a predetermined value. If each estimation error value 503 falls within the estimation error threshold 505, the process proceeds to step S310 indicating the end of the process. If there are estimation error values 503 equal to or greater than the estimation error threshold 505, the process proceeds to step S305.

In step S305, the estimation error mapping unit 106 detects a time domain in which the estimation error values 503 exceeding the predetermined value are present and extracts this time domain as a modification time domain 504.

In step S306, the estimation error mapping unit 106 extracts the electromagnetic wave paths of electromagnetic waves that have reached at times included in the modification time domain 504. In the example of FIG. 5, the electromagnetic wave paths 702d and 702e are extracted as electromagnetic wave paths corresponding to this domain. By referring to FIG. 7, it is understood that the electromagnetic waves passing through the electromagnetic wave paths 702d and 702e have been reflected by a right or upper wall.

Figure 8:
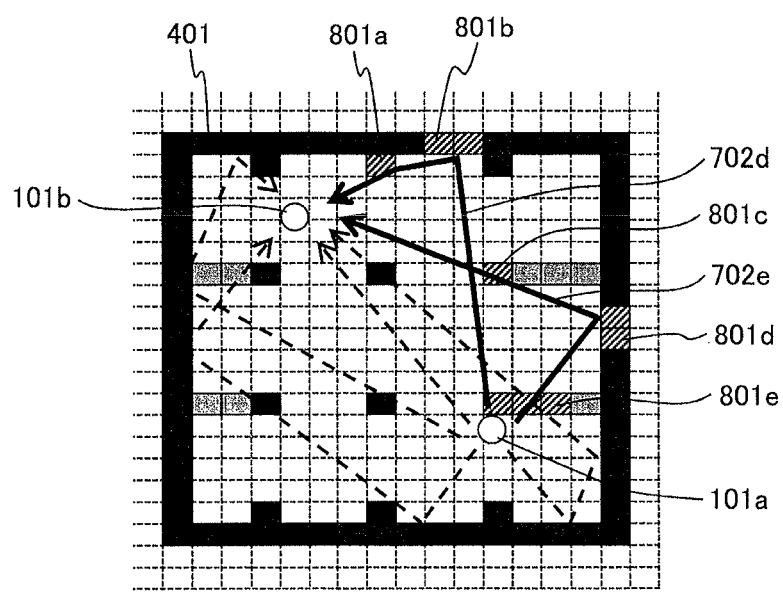
FIG. 8 is a diagram showing an example of modification pieces contributing to electromagnetic wave paths 702d and 702e.

In step S307, the estimation error mapping unit 106 retrieves pieces 601 contributing to the electromagnetic wave paths extracted in step S306 and extracts the retrieved pieces as modification pieces 801. FIG. 8 shows an example of modification pieces contributing to the electromagnetic wave paths 702d and 702e. In FIG. 8, modification pieces 801a, 801b, 801c, 801d, and 801e contribute to the electromagnetic wave paths 702d and 702e belonging to the modification time domain 504. As used herein, "contribute" means that the piece has a reflection position, diffraction position, or transmission position of the electromagnetic wave path.

In FIG. 8, the estimation error mapping unit 106 extracts, with respect to the electromagnetic wave path 702d, a modification piece 801b having a reflection position, a modification piece 801a having a diffraction position, and a modification piece 801e having a transmission position. The estimation error mapping unit 106 also extracts, with respect to the electromagnetic wave path 702e, a modification piece 801d having a reflection position and modification pieces 801c and 801e each having a transmission position. The modification piece 801e is extracted as a modification piece contributing to both the electromagnetic wave paths 702d and 702e.

Step S310 represents the end of the process.

The question generation unit 107 generates a question for modifying the electrical properties (permittivity, permeability, conductivity, or the like) of the existing three-dimensional structure information which has been initially set, using the estimation error values 503, the electromagnetic wave paths 702, and the modification pieces 801 corresponding to the modification time domain 504 of FIG. 5 obtained by the estimation error mapping unit 106.

Figure 9:
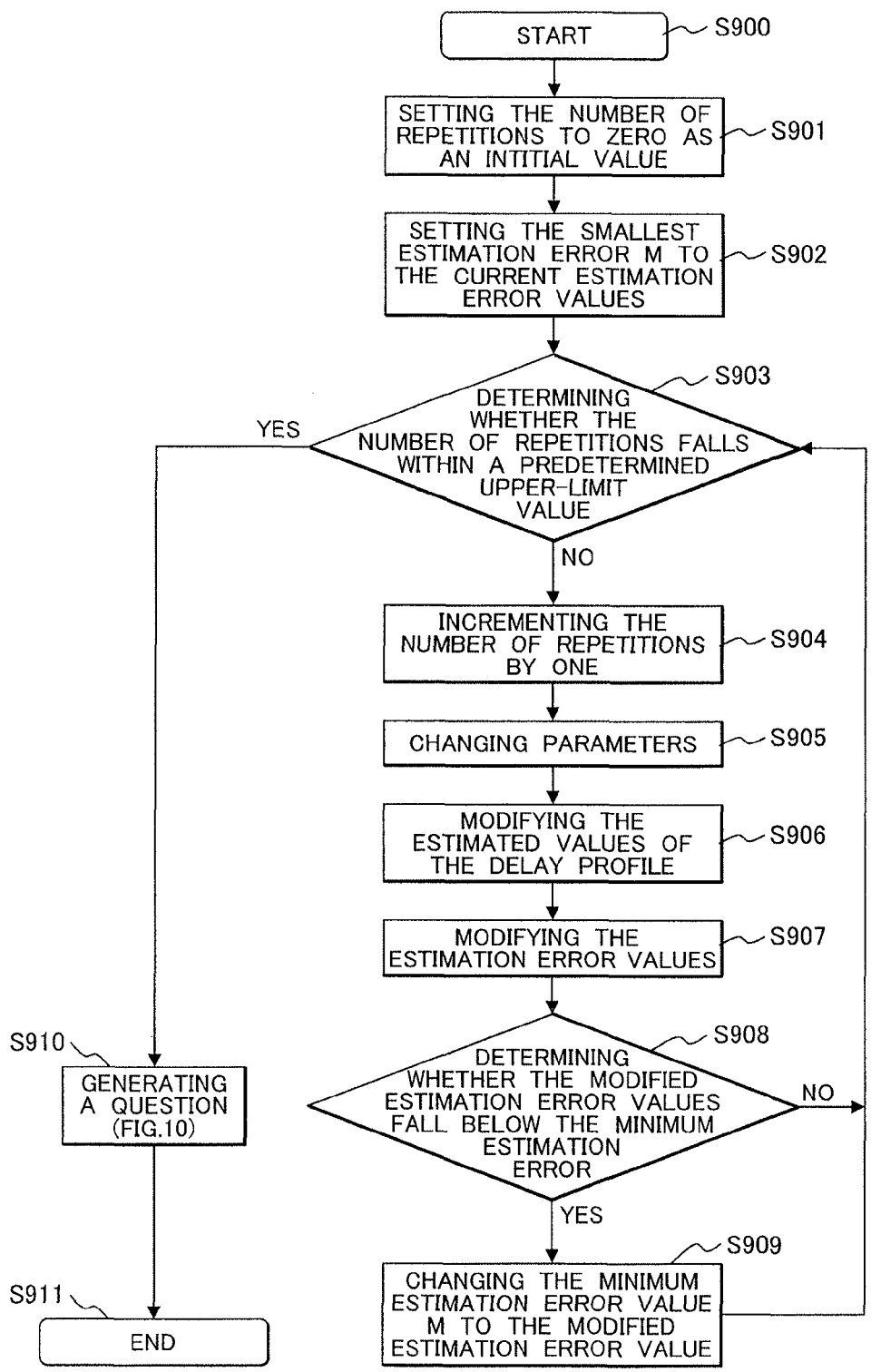
FIG. 9 is a diagram showing an example of the flow of a process performed by a question generation unit 107 of FIG. 1.

That is, with respect to the time domain 504 of FIG. 5, in which the estimated values 502 significantly deviate from the measured values 501, i.e., with respect to the electromagnetic wave paths 702d and 702e corresponding to this time domain, it is believed that the electrical properties (permittivity, permeability, conductivity, or the like) of the three-dimensional structure information deviate from the actual values and thus the large estimation error values 503 have occurred. For this reason, the question generation unit 107 estimates a value which is deemed to be correct and generates a question for checking whether modification should be performed. FIG. 9 shows the flow of a process performed by the question generation unit 107.

The first step, S900, of this process flow represents the start of the process.

Step S901 is a step of setting the number of repetitions, which is counted when steps from S903 to 909 are repeated, to 0 serving as an initial value.

Step S902 is a step of setting the current estimation error values as initial values in order to modify the estimation errors of FIG. 5 in repeated processes to obtain the smallest estimation error M.

In step S903, the question generation unit 107 determines whether the number of repetitions falls within a predetermined upper-limit value. If the number of repetitions exceeds the upper-limit value, the process proceeds to step S910. If the number of repetitions falls within the predetermined upper-limit value, the process proceeds to step S904.

In step S904, which is the first step performed when the number of repetitions falls within the predetermined upper-limit value, the question generation unit 107 increments the number of repetitions by 1.

In step S905, the question generation unit 107 changes parameters related to the electromagnetic wave paths 702 and the modification pieces 801 belonging to the modification time domain 504 (FIG. 5). For the electromagnetic wave paths 702, the parameters to be changed are, for example, the arrival times of the electromagnetic wave paths 702; for the modification pieces 801, the parameters to be changed are the electrical properties (permittivity, permeability, conductivity, or the like) of the modification pieces 801. The amount of change of these values can be obtained using optimizing algorithms, including the genetic algorithm, the design of experiments, and the simplex method.

In step S906, using the modified parameters, the question generation unit 107 re-obtains the arrival times, the amounts of reflection, the amounts of diffraction, and the amounts of transmission of the electromagnetic wave paths 702 to modify the estimated values of the delay profile.

In step S907, the question generation unit 107 compares the modified estimated values of the delay profile with the corresponding measured values 501 to obtain new estimation error values.

In step S908, the question generation unit 107 determines whether the modified estimation error values fall below the minimum estimation error. If the estimation error values do not fall below the minimum estimation error, the process returns to step S903. In this case, steps from S903 to S908 are repeated again. Since the last set parameters have resulted in increases in estimation error, new parameters which consider such results are set in the parameter change step S905.

In step S909, the question generation unit 107 changes the minimum estimation error value M set in step S902 to the modified estimation error value. In this series of steps, the parameters have been improved to become even more appropriate ones than the initially set ones. However, to further improve the parameters, steps from S903 to S908 are repeated again. Since the last set parameters have resulted in reductions in estimation error, new parameters which consider such results are set in the parameter change step S905.

Steps from S903 to S908 are continued until the number of repetitions set in step S901 is complete. The parameters corresponding to the latest estimation error values (therefore, the minimum values) which have been updated during these steps can be obtained as final values.

For the electromagnetic wave paths, the parameters obtained are the arrival times of the electromagnetic wave paths; for the modification pieces, the parameters obtained are electrical properties (permittivity, permeability, conductivity, or the like) of the modification pieces.

Figure 10:
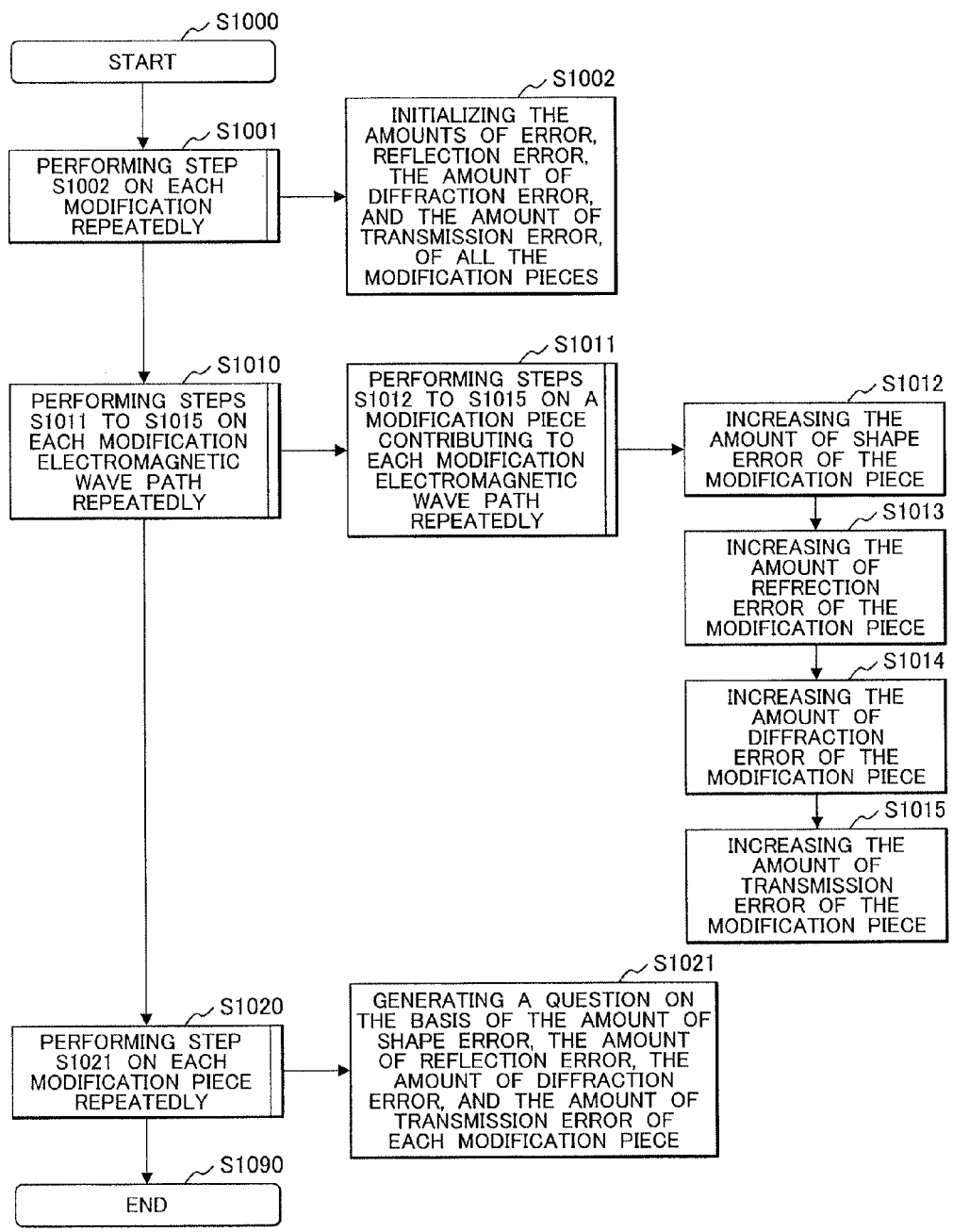
FIG. 10 is a diagram showing an example of details of step S910 in the process flow of FIG. 9.

Step S910 is a step of generating a question related to each modification piece. That is, the question generation unit 107 generates a question by comparing a parameter set which has yet to be processed repeatedly with a parameter set which has obtained the minimum estimation error M in the repeated processes. Details are shown in FIG. 10. Step S911 represents an end step.

FIG. 10 is a flow showing details of the question generation step (step S910).

Step S1000 represents the start of the process.

Step S1001 is a step of repeatedly performing step S1002 on each modification piece.

Step S1002 is a step of initializing the amounts of error of all the modification pieces 801. The amount of shape error, the amount of reflection error, the amount of diffraction error, and the amount of transmission error are defined as the amount of error. It is known that the shape is related to the delay time of the electromagnetic wave path and that reflection, diffraction, and transmission are determined by electrical properties (permittivity, permeability, conductivity, or the like) of the piece. Among the amounts of error, the amount of reflection error, for example, refers to the difference between the amount of reflection determined by a parameter set which has yet to be repeatedly processed and a parameter set which has been repeatedly processed and then obtained an estimation error M. The other amounts of error are also the same concept. Initialization of the amount of error only requires setting an appropriate value.

Step S1010 is a step of repeatedly performing steps S1011 to 1015 on each modification electromagnetic wave path 702. As used herein, the modification electromagnetic wave path 702 refers to an electromagnetic wave path to be modified and also refers to an electromagnetic wave path determined by a parameter set which has been repeatedly processed and then obtained an estimation error M.

Step S1011 is a step of repeatedly performing steps S1012 to 1015 on a modification piece contributing to each modification electromagnetic wave path 702.

Step S1012 is a step of regarding the difference between the yet-to-be-modified delay time and the modified delay time of each modification electromagnetic wave path 702 as the amount of shape error and then adding this amount of shape error to the initial value of the amount of shape error of the modification piece. The amounts of difference having positive values and the amounts of difference having negative values are separately organized using symbols.

Steps S1013 to 1015 are steps of regarding, as the amount of error, the difference between the yet-to-be-modified amount and the modified amount corresponding to the type of the contribution to the modification electromagnetic wave path of the modification piece and then adding the amount of error to the initial value. In this way, the difference between the amounts of reflection, the difference between the amounts of diffraction, or the difference between the amounts of transmission resulting from changes in the value of the electrical properties (permittivity, permeability, conductivity, or the like) due to modification of the parameter set is obtained as the amount of reflection error, the amount of diffraction error, or the amount of transmission error.

At the point in time when it is confirmed in step S1010 that the flow of the series of subordinate steps has been executed, a set of the new amounts of error (the amount of shape error, the amount of reflection error, the amount of diffraction error, and the amount of transmission error) of the modification pieces related to all the modification electromagnetic wave paths has been prepared.

Step S1020 is a step of repeatedly performing step S1021 on each modification piece.

Step S1021 is a step of generating a question on the basis of the amount of shape error, the amount of reflection error, the amount of diffraction error, and the amount of transmission error of each modification piece. The question generation unit 107 generates a question about whether the amount of error equal to or greater than a reference can be modified after the parameter set is modified.

Specifically, if the amount of shape error is greater than or equal to a predetermined amount, the question generation unit 107 generates a question requesting modification of shape information of the piece. Further, when the amount of reflection error, the amount of diffraction error, or the amount of transmission error exceeds a predetermined value, the question generation unit 107 generates a question requesting modification of material properties of the piece.

As described below, the method for generating a question may be changed on the basis of the sign of each amount of error. For example, when the amount of reflection attenuation is determined to be underestimated, the question generation unit 107 generates a question requesting modification of the material properties into those having a larger amount of reflection attenuation than the yet-to-be-modified set value.

Figure 11:
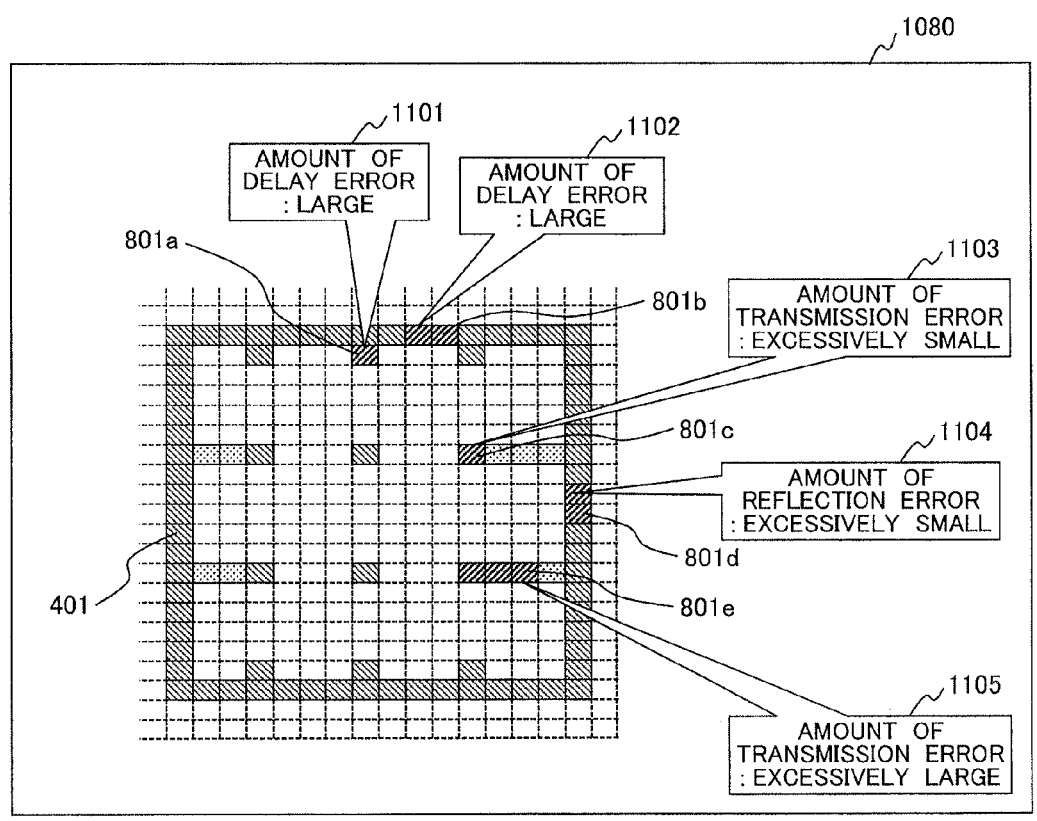
FIG. 11 is a diagram showing an example of display made by an estimation error display unit 108.

The estimation error display unit 108 of FIG. 1 displays the state of the modification pieces 801 in such a manner that the state is superimposed on three-dimensional structure information. FIG. 11 shows an example of display made by the estimation error display unit 108.

A screen 1080 of the estimation error display unit 108 displays the three-dimensional structure information 401 using pieces. In particular, the modification pieces 801 are displayed in such a manner so as to be distinguished from other pieces. In FIG. 11, five modification pieces 801*a* to 801*e* are extracted and displayed as accompanied with the respective states. The states may be displayed in any form. In FIG. 11, the states are displayed in the form of result information, for example, indicating that the amount of error is greater (smaller) than a reference.

The screen 1080 of the estimation error display unit 108 displays information related to three-dimensional structure information of areas located on the electromagnetic wave paths on a layout drawing of structures included in the site at which a wireless network system is planned to be constructed. Examples of the information related to the three-dimensional structure information include information indicating that the values of electrical properties of a structure in any area are not appropriate and information pointing out modification of the values of electrical properties of the structure in the area.

For example, state display parts 1101 to 1105 show the states of the amounts of error as the states of the modification piece 801*a* to 801*e*. These show the type of the largest of the amounts of error and the direction of the error.

For example, the state display parts 1101 and 1102 corresponding to the modification pieces 801*a* and 801*b* indicate that the amounts of delay error of these modification pieces are the largest of the amounts of error. That is, these state display parts indicate that three-dimensional shape information around the pieces 801*a* and 801*b* needs to be modified.

The state display part 1103 corresponding to the modification piece 801*c* is an example indicating that the amount of transmission error, that is, the amount of transmission attenuation is set to an excessively small amount. That is, the state display part 1103 indicates that the amount of transmission attenuation needs to be modified so that the amount of transmission attenuation is increased in three-dimensional structure information included in the piece 801*c*.

The state display part 1104 corresponding to the modification piece 801*d* is an example indicating that the amount of reflection error, that is, the amount of reflection attenuation is set to an excessively small amount. That is, the state display part 1104 indicates that the amount of reflection attenuation of the piece 801*d* needs to be modified so that the amount of reflection attenuation is increased.

The state display part 1105 corresponding to the modification piece 801*c* indicates that the amount of transmission error is overestimated, that is, the amount of transmission attenuation is set to an excessively large amount compared to the measured value. That is, the state display part 1105 indicates that, in three-dimensional structure information included in the piece 801*e*, the setting needs to be modified so that the amount of transmission attenuation is reduced.

When the estimation error display unit 108 displays the screen, each piece may be displayed to the user more visibly by changing the display color on the basis of the type and size of each amount of error. Further, the user may select a modification piece 801 from among the displayed modification pieces 801 by using an input unit configured to receive interactive input from the user.

Figure 12:
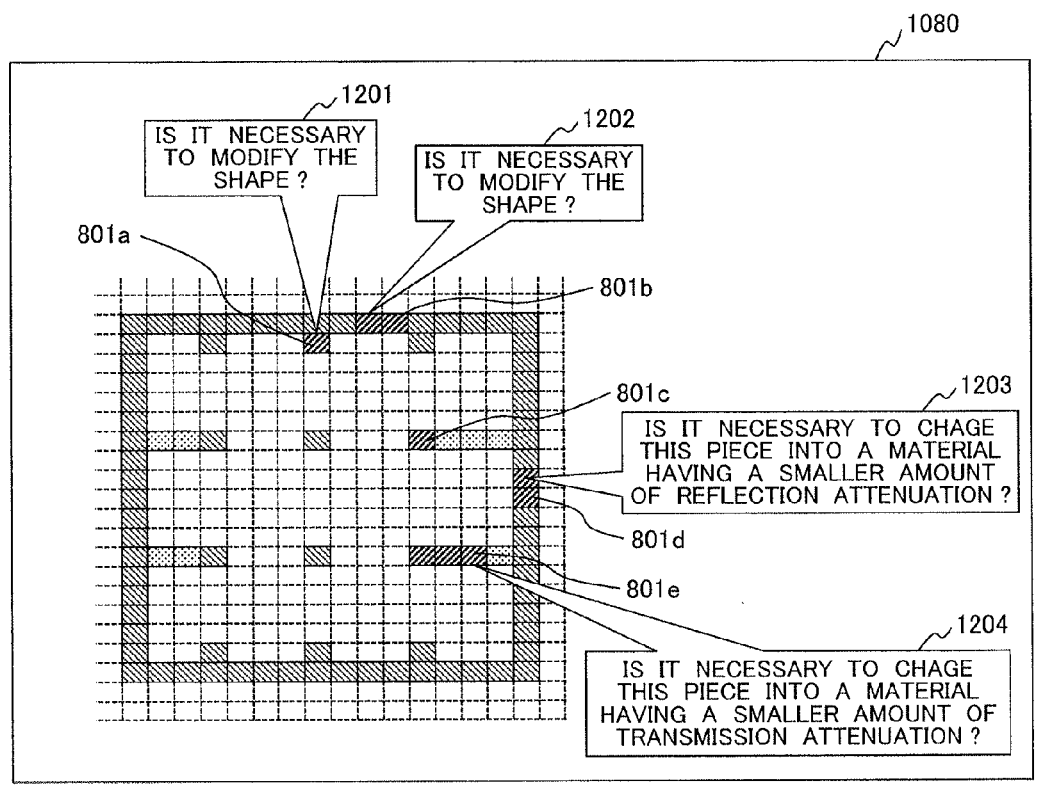
FIG. 12 is a diagram showing an example of display made by the estimation error display unit 108.

While FIG. 11 displays the state of each modification piece, FIG. 12 shows an example in which a question generated by the question generation unit 107 is displayed with respect to each of the selected modification pieces.

For example, question display parts 1201 and 1202 corresponding to the modification pieces 801*a* and 801*b* are asking the user about whether the user will change the shapes around the modification pieces 801*a* and 801*b*, which need to be modified.

A question display part 1203 corresponding to the modification piece 801*d* is asking the user about whether the user will change this piece into a material having electrical properties having a smaller amount of reflection attenuation.

A question display part 1204 corresponding to the modification piece 801*e* is asking the user about whether the user will change the piece into a material having electrical properties having a smaller amount of transmission attenuation.

The three-dimensional structure information modification means 109 of FIG. 1 receives answers to the questions from the user and modifies the three-dimensional structure information on the basis of the answers.

Alternatively, if the user determines that with respect to a question about a piece, the piece does not need to be modified, the user may select one of "determined" and "undetermined."

If "determined" is selected, the question generation unit 107 re-obtains the amount of error of the piece and regards the re-obtained amount of error as the amount of error of another piece.

If "undetermined" is selected, the question generation unit 107 re-obtains the amount of error of the piece and makes a trial calculation of a wider range of parameters with respect to the re-obtained amount of error. By repeating the above process until the estimation error falls below a predetermined value, three-dimensional structure information modified using the measured value is obtained.

As seen above, according to the first embodiment of the present invention, by showing the user the modification positions of the three-dimensional structure information on the basis of the measured values, the user can recognize the modification positions clearly. Further, by modifying the three-dimensional structure information on the basis of the questions, the user can construct more accurate three-dimensional structure information with a simple operation.

As seen in the display examples of FIGS. 11 and 12, a display related to questions may be in various forms. In FIG. 11, questions are generated in a form where only the size of the amount of error is displayed; in FIG. 12, direct questions about whether the user will modify the amount of error are generated.

In these examples, the radio wave propagation environment measuring apparatus 100 only displays the measurement results. That is, the radio wave propagation environment measuring apparatus 100 refers to the operator, who is a user, for a decision as to whether modification should be made and supports the operator by providing information to the operator to prevent the operator from making a wrong decision.

The reason why such question form is employed and a final decision is sought from the operator as seen above is that there are many cases in which sufficient information about the structures or the like included in the site at which a wireless network system is planned to be constructed has not been grasped. Accordingly, if sufficient information about the structures or the like included in the site at which a wireless network system is planned to be constructed has been already obtained, a finally obtained parameter set may be provided as new radio wave propagation environment data.

In this case, it is possible to use the new radio wave propagation environment data without seeking a decision from the operator.

Second Embodiment

Figure 2:
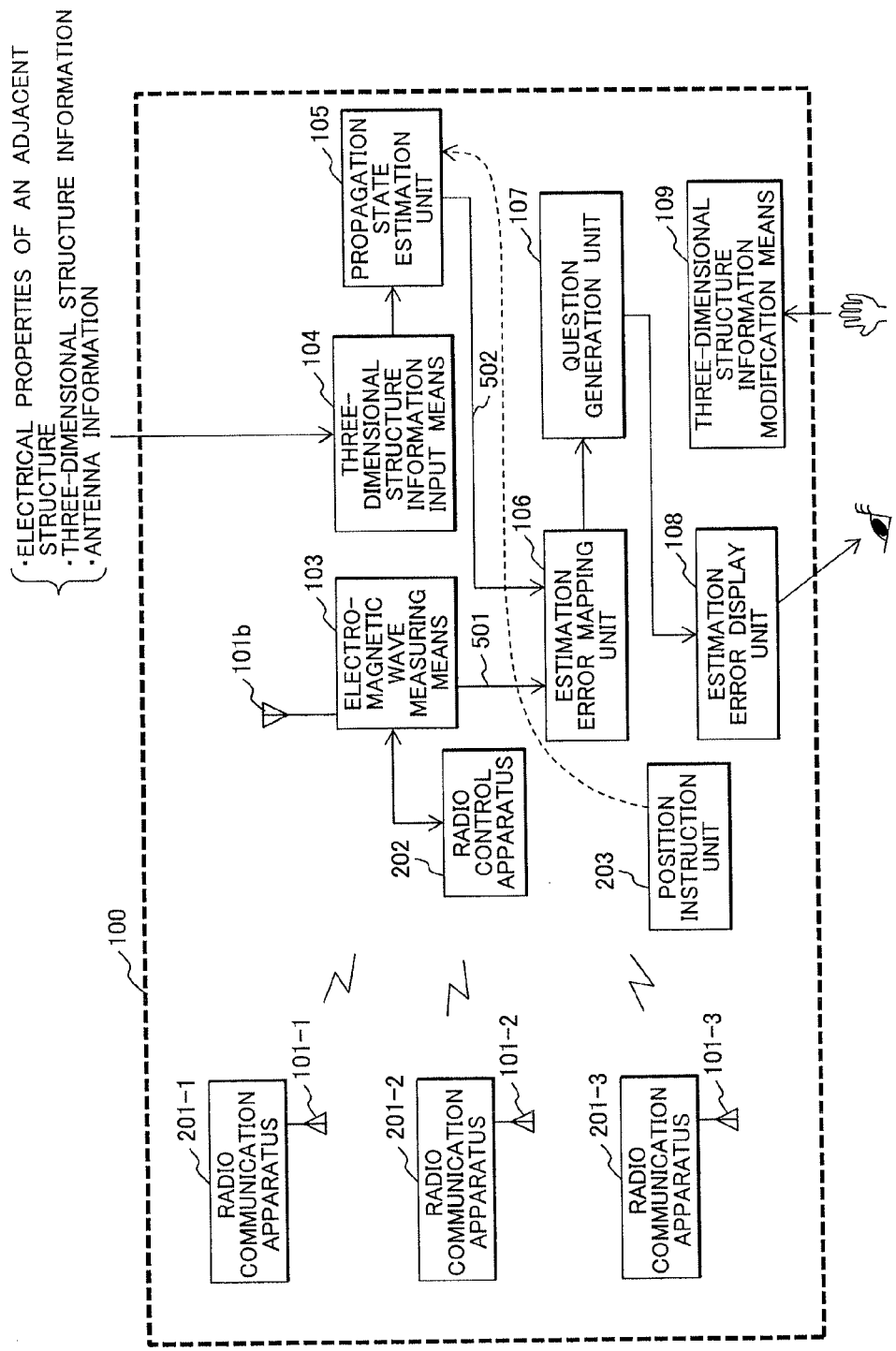
FIG. 2 is a diagram showing an example configuration of a radio wave propagation environment measuring apparatus according to a second embodiment.

FIG. 2 shows a second embodiment of the present invention. A principal objective of the first embodiment is to measure the radio wave propagation environment and to modify information about the structures or the like included in the site. That of a second embodiment, on the other hand, is to provide a wireless network construction system which, when the antenna is disposed in a position having an unfavorable communication environment, can teach a more appropriate position.

The radio wave propagation environment measuring apparatus 100 of FIG. 2 differs from that of FIG. 1 that the electromagnetic wave transmission means 102 is composed of multiple radio communication apparatuses 201 and that a radio control apparatus 202 and a position instruction unit 203 are included.

Figure 13:
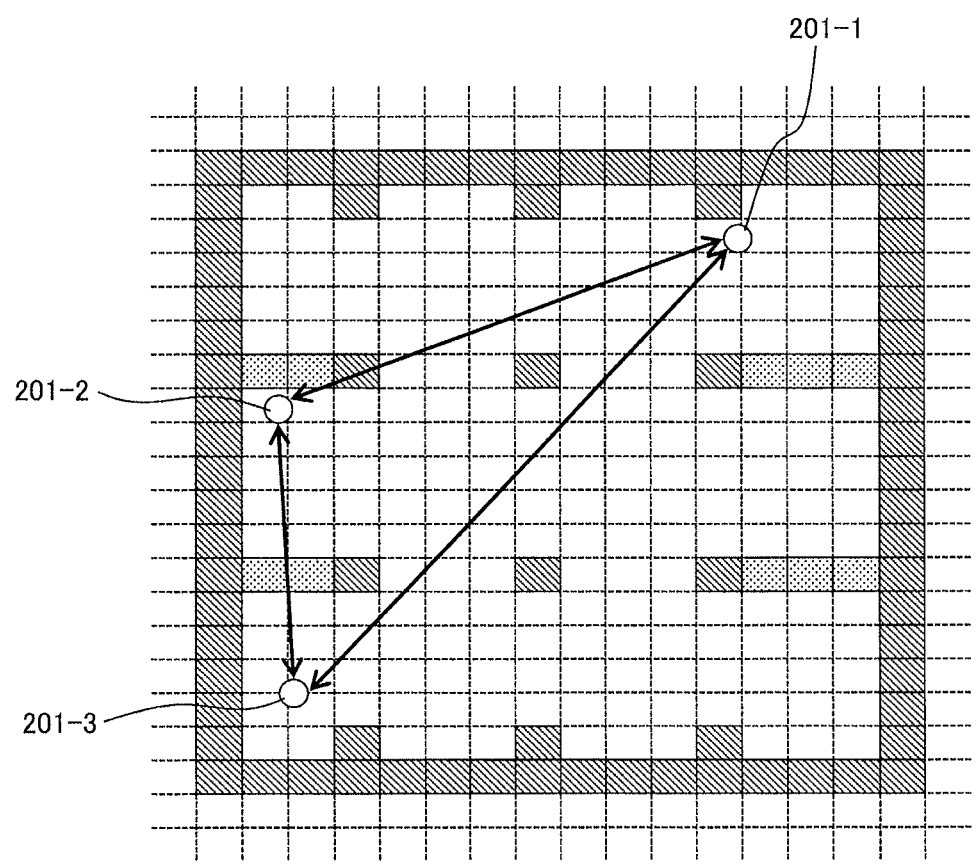
FIG. 13 is a diagram showing an example of the disposition of radio communication apparatuses according to the second embodiment.

As shown in FIG. 13, the radio communication apparatuses 201-1 to 201-3 are disposed in positions at the site at which a wireless network system is planned to be constructed and communicate with one another. While three radio communication apparatuses are shown in FIG. 2, two radio communication apparatuses, or four or more radio communication apparatuses may be disposed.

The radio control apparatus 202 communicates with the radio communication apparatuses 201 and can control the operation of the radio communication apparatuses 201. Further, the radio control apparatus 202 operates in synchronization with the electromagnetic wave measuring means. Thus, the electromagnetic wave measuring means 103 can measure radio signals transmitted by the radio communication apparatuses 201. The three-dimensional structure information input means 104 receives input of the positions and directions of antennas 101-1 to 101-3 of the radio communication apparatuses.

According to the above configuration, by performing the process described in the first embodiment on each radio communication apparatus 201, modified three-dimensional structure information can be obtained.

The position instruction unit 203 has a function of modifying the positions of the antennas 101-1 to 101-3 of the radio communication apparatuses 201. Specifically, the position instruction unit 203 obtains positions of the antennas 101-1 to 101-3 where the communication state is better by causing the propagation state estimation unit 105 to estimate the propagation state among the radio apparatuses using the modified three-dimensional structure information. The position instruction unit 203 displays the new positions of the antennas in such a manner that the new positions are superimposed on the three-dimensional structure information.

As seen above, according to the second embodiment of the present invention, it is possible to change, with an easier operation, the positions of the antennas of the wireless network to positions where the communication state is better.

Third Embodiment

A radio wave propagation environment measuring apparatus according to a third embodiment of the present invention includes a material property database.

In the questions 1203 and 1204 about the change of the material in FIG. 12, a predetermined number of ones of the material properties registered in the material property database with respect to the direction of change of each property and the amount of error are listed in the descending order of correlation. The user selects from among the listed material properties.

This is possible by, with respect to the amounts of error attributable to the electrical material properties and the directions of excessively small and excessively large, obtaining the difference between the yet-to-be-modified electrical material properties and the amount of reflection attenuation, the amount of transmission attenuation, and the amount of diffraction attenuation based on each characteristic value in the material property database and then listing, in the descending order of correlation, a predetermined number of ones of the obtained differences.

As seen above, according to the third embodiment of the present invention, it is possible to modify, with an easier operation, the three-dimensional structure information along the directions of the amount of error and modification.

LIST OF REFERENCE SIGNS

1: radio wave environment measuring apparatus 101: antenna, 102: electromagnetic wave transmission means, 103: electromagnetic wave measuring means, 104: propagation state estimation unit, 105: three-dimensional structure information input means, 106: estimation error mapping unit, 107: question generation unit, 108: estimation error display unit, 109: three-dimensional structure information modification means.

The invention claimed is:

1. A radio wave propagation environment measuring apparatus comprising:
   an electromagnetic wave transmission means disposed at a site at which a radio network system is planned to be constructed, the electromagnetic wave transmission means being configured to transmit a radio signal;
   an electromagnetic wave measuring means configured to receive the radio signal to obtain an electromagnetic wave measured value at each of a plurality of times;
   a radio control apparatus configured to communicate with and control the electromagnetic wave transmission means and the electromagnetic wave measuring means;
   a three-dimensional structure input means configured to input an electrical property and three-dimensional structure information of a structure included in the site, the three-dimensional structure information including three-dimensional shape information;
   a propagation state estimation unit configured to estimate an electromagnetic wave propagation state between the electromagnetic wave transmission means and the electromagnetic wave measuring means using the three-dimensional structure information to obtain an electromagnetic wave estimated value at each of the plurality of times;
   an estimation error mapping unit configured to make a comparison between the electromagnetic wave measured and estimated values for each of the plurality of times, the electromagnetic wave measured and estimated values being expressed as signal strength, to obtain a time series of error values, to determine where an error value in the time series of error values between the electromagnetic wave measured and estimated values is greater than a reference value, and to obtain a path through which a radio signal from the electromagnetic wave transmission means is received by the electromagnetic wave measuring means, the path being referred to as an electromagnetic wave path; and
   a question generation unit configured to re-obtain the electromagnetic wave estimated value when the error value is greater than the reference value by modifying the three-dimensional structure information of an area located on the electromagnetic wave path and to make a comparison between the electromagnetic wave measured value and the re-obtained electromagnetic wave estimated value to modify the three-dimensional structure information so that the error value becomes smaller than the reference value.

2. The radio wave propagation environment measuring apparatus according to claim 1, further comprising
   a display apparatus configured to display information related to the three-dimensional structure information of the area located on the electromagnetic wave path on a layout drawing of the structure included in the site at which a radio network system is planned to be constructed.

3. The radio wave propagation environment measuring apparatus according to claim 2, wherein
   the information related to the three-dimensional structure information displayed on the display apparatus is information indicating that a value of an electrical property of a structure in the area is not appropriate.

4. The radio wave propagation environment measuring apparatus according to claim 2, wherein
   the information related to the three-dimensional structure information displayed on the display apparatus is information pointing out modification of a value of an electrical property of a structure in the area.

5. The radio wave propagation environment measuring apparatus according to claim 1, further comprising
   a three-dimensional structure information modification means configured to modify a value of the three-dimensional structure information.

6. The radio wave propagation environment measuring apparatus according to claim 5, wherein the three-dimensional structure information modification means selects and inputs one of determined and undetermined as an attribute value of a material property.

7. The radio wave propagation environment measuring apparatus according to claim 1, further comprising
a material property estimation unit configured to divide target space of the site at which a radio network system is planned to be constructed into blocks and to estimate a material property of a three-dimensional shape for each of the blocks.

8. The radio wave propagation environment measuring apparatus according to claim 2, further comprising
a three-dimensional structure information modification means configured to modify a value of the three-dimensional structure information.

9. The radio wave propagation environment measuring apparatus according to claim 3, further comprising
a three-dimensional structure information modification means configured to modify a value of the three-dimensional structure information.

10. The radio wave propagation environment measuring apparatus according to claim 4, further comprising
a three-dimensional structure information modification means configured to modify a value of the three-dimensional structure information.

11. The radio wave propagation environment measuring apparatus according to claim 2, further comprising
a material property estimation unit configured to divide target space of the site at which a radio network system is planned to be constructed into blocks and to estimate a material property of a three-dimensional shape for each of the blocks.

12. The radio wave propagation environment measuring apparatus according to claim 3, further comprising
a material property estimation unit configured to divide target space of the site at which a radio network system is planned to be constructed into blocks and to estimate a material property of a three-dimensional shape for each of the blocks.

13. The radio wave propagation environment measuring apparatus according to claim 4, further comprising
a material property estimation unit configured to divide target space of the site at which a radio network system is planned to be constructed into blocks and to estimate a material property of a three-dimensional shape for each of the blocks.

14. The radio wave propagation environment measuring apparatus according to claim 5, further comprising
a material property estimation unit configured to divide target space of the site at which a radio network system is planned to be constructed into blocks and to estimate a material property of a three-dimensional shape for each of the blocks.

15. The radio wave propagation environment measuring apparatus according to claim 6, further comprising
a material property estimation unit configured to divide target space of the site at which a radio network system is planned to be constructed into blocks and to estimate a material property of a three-dimensional shape for each of the blocks.

16. A radio wave propagation environment measuring apparatus comprising:
an electromagnetic wave transmission means disposed at a site at which a radio network system is planned to be constructed, the electromagnetic wave transmission means being configured to transmit a radio signal;
an electromagnetic wave measuring means configured to receive the radio signal to obtain an electromagnetic wave measured value at each of a plurality of times;
a radio control apparatus configured to communicate with and control the electromagnetic wave transmission means and the electromagnetic wave measuring means;
a three-dimensional structure input means configured to input an electrical property and three-dimensional structure information of a structure included in the site, the three-dimensional structure information including three-dimensional shape information;
a propagation state estimation unit configured to estimate an electromagnetic wave propagation state between the electromagnetic wave transmission means and the electromagnetic wave measuring means using the three-dimensional structure information to obtain an electromagnetic wave estimated value at each of the plurality of times;
an estimation error mapping unit configured to make a comparison between the electromagnetic wave measured and estimated values for each of the plurality of times, the electromagnetic wave measured and estimated values being expressed as signal strength, to obtain a time series of error values, to determine where an error value in the time series of error values between the electromagnetic wave measured and estimated values is greater than a reference value, and to obtain a path through which a radio signal from the electromagnetic wave transmission means is received by the electromagnetic wave measuring means, the path being referred to as an electromagnetic wave path;
a question generation unit configured to re-obtain the electromagnetic wave estimated value when the error value is greater than the reference value by modifying the three-dimensional structure information of an area located on the electromagnetic wave path and to make a comparison between the electromagnetic wave measured value and the re-obtained electromagnetic wave estimated value to modify the three-dimensional structure information so that the error value becomes smaller than the reference value;
a display apparatus configured to display information related to the three-dimensional structure information of the area located on the electromagnetic wave path on a layout drawing of the structure included in the site at which a radio network system is planned to be constructed; and
a three-dimensional structure information modification means configured to modify a value of the three-dimensional structure information.

17. A wireless network construction system comprising:
radio communication apparatuses disposed in positions at a site at which a radio network system is planned to be constructed, the radio communication apparatuses being configured to transmit or receive a radio signal;
a radio control apparatus configured to communicate with and control the radio communication apparatuses;
an electromagnetic wave measuring means configured to receive, from the radio control apparatus, radio signals transmitted by the radio communication apparatuses to obtain electromagnetic wave measured values and a position and direction of an antenna of each radio communication apparatus;
a three-dimensional structure input means configured to receive an electrical property and three-dimensional structure information of a structure included in the site, the three-dimensional structure information including three-dimensional shape information;

a propagation state estimation unit configured to estimate an electromagnetic wave propagation state between the electromagnetic wave transmission means and the electromagnetic wave measuring means using the three-dimensional structure information to obtain an electromagnetic wave estimated value at each of a plurality of times;

an estimation error mapping unit configured to make a comparison between the electromagnetic wave measured and estimated values for each of the plurality of times, the electromagnetic wave measured and estimated values being expressed as signal strength, to obtain a time series of error values, to determine where an error value in the time series of error values between the electromagnetic wave measured and estimated values is greater than a reference value, and to obtain a path through which a radio signal from the electromagnetic wave transmission means is received by the electromagnetic wave measuring means, the path being referred to as an electromagnetic wave path;

a question generation unit configured to re-obtain the electromagnetic wave estimated value when the error value is greater than the reference value by modifying the three-dimensional structure information of an area located on the electromagnetic wave path and to make a comparison between the electromagnetic wave measured value and the re-obtained electromagnetic wave estimated value to modify the three-dimensional structure information so that the error value becomes smaller than the reference value; and an antenna position instruction means configured to cause the propagation state estimation unit to change the antenna position and estimate propagation on the basis of the modified three-dimensional structure information and to present an antenna position in which there exists a propagation state similar to a desired propagation state of a plurality of propagation states.

18. A method for measuring a radio wave propagation environment, comprising:

installing radio signal transmission and reception apparatuses at a site at which a radio network system is planned to be constructed and obtaining an electromagnetic wave measured value of a radio signal between the radio signal transmission and reception apparatuses at each of a plurality of times;

communicating with and controlling the radio signal transmission and reception apparatuses;

estimating an electromagnetic wave propagation state of a radio signal between the radio signal transmission and reception apparatuses using an electrical property and three-dimensional structure information of a structure included in the site, the three-dimensional structure information including three-dimensional shape information, to obtain an electromagnetic wave estimated value at each of the plurality of times;

making a comparison between the electromagnetic wave measured and estimated values for each of the plurality of times, the electromagnetic wave measured and estimated values being expressed as signal strength, to obtain a time series of error values, to determine where an error value in the time series of error values between the electromagnetic wave measured and estimated values is greater than a reference value;

obtaining, as an electromagnetic wave path, a path between the radio signal transmission and reception apparatuses, of a radio signal received;

modifying the three-dimensional structure information of an area located on the electromagnetic wave path to re-obtain the electromagnetic wave estimated value when the error value is greater than the reference value; and making a comparison between the electromagnetic wave measured value and the re-obtained electromagnetic wave estimated value to modify the three-dimensional structure information so that the error value becomes smaller than the reference value.

* * * * *